(12) United States Patent
Jahr et al.

(10) Patent No.: US 8,671,392 B2
(45) Date of Patent: Mar. 11, 2014

(54) INTEGRATING SOFTWARE APPLICATIONS (75) Inventors: Andreas Jahr, Karlsruhe (DE); Dennis Koerner, Karlsdorf-Neuthard (DE); Ralf Kurt Mueller, Hockenheim (DE)

(73) Assignee: SAP AG, Walldorf (DE)

( * ) Notice: Subject to any disclaimer, the term of this patent is extended or adjusted under 35 U.S.C. 154(b) by 120 days.

(21) Appl. No.: 13/355,683

(22) Filed: Jan. 23, 2012

(65) Prior Publication Data

US 2013/0191820 A1 Jul. 25, 2013

(51) Int. Cl.
G06F 9/44 (2006.01)
G06F 9/445 (2006.01)

(52) U.S. Cl.
USPC ............................ 717/120; 717/101; 717/170

(58) Field of Classification Search
USPC .................................................. 717/100–140
See application file for complete search history.

(56) References Cited

U.S. PATENT DOCUMENTS 8,037,467 B2 * 10/2011 Bandaram et al. ............ 717/166

* cited by examiner

*Primary Examiner* — Chuck Kendall
(74) *Attorney, Agent, or Firm* — Fish & Richardson P.C.

(57) ABSTRACT

Techniques for integrating software applications include identifying an enterprise application executable in a first computing environment, where the enterprise application is compatible with a first version of a network application executable in a second computing environment so that a first set of functionality of the first version of the network application is exposed through the enterprise application. The features include identifying a second version of the network application executable in the second computing environment. The second version of the network application includes a second set of functionality at least partially distinct from the first set of functionality. The features include delivering an integration component from the second computing system to the first computing system. The integration component includes a non-modifying add-on component to the enterprise application that exposes at least a portion of the second set of functionality of the second version of the network application through the enterprise application.

27 Claims, 4 Drawing Sheets

INTEGRATING SOFTWARE APPLICATIONS

TECHNICAL BACKGROUND

This disclosure relates to integrating software applications and, more particularly, integrating software applications operating in separate computing environments.

BACKGROUND

Hybrid software landscapes often include a combination of an on-demand application (e.g., a hosted or network application) and an on-premise application (e.g., an enterprise application) to achieve an end-to-end scenario. Combining on-premise and on-demand application not only combines the known challenges of on-demand and on-premise applications, but also introduces new challenges due to the hybrid operation model of the end-to-end solution. Such challenges define support and production requirements for all parties, such as, for example, a software developer of the on-demand and/or on-premise applications, a software provider of such applications (which may be the same as the software developer), and the business enterprise that uses the on-demand and/or on-premise applications. For example, one goal of a networked solution (e.g., combination of an on-demand and on-premise application) is to hide added complexity of the hybrid operation model as much as possible from the business enterprise in order to, for instance, decrease total cost of ownership (TCO) for the enterprise as well as the software developer/provider.

One issue encountered in a hybrid operation model is that only one version of an on-demand application (i.e., one release) may be in use at the service provider (or other hoster of the application). Typically, the service provider decides on its own patch/update/upgrade cycles independent of the business enterprise, which has virtually no impact on these decisions. For instance, while on-premise applications may be changed (patched, upgraded, updated) with a very slow frequency while maintaining all of its versions for a long time, on-demand applications ship more often while dropping support for older releases more quickly. Further, on-demand applications may need to serve multiple on-premise application versions at once, since different enterprises may operate different on-premise application versions.

SUMMARY

In one general embodiment, techniques for integrating software applications include the features of identifying at least one enterprise application executable in a first computing environment. The enterprise application is compatible with a first version of a network application executable in a second computing environment communicably coupled to the first computing environment so that a first set of functionality of the first version of the network application is exposed through the enterprise application. The features further include identifying a second version of the network application executable in the second computing environment. The second version of the network application includes a second set of functionality at least partially distinct from the first set of functionality. The features further include delivering an integration component from the second computing system to the first computing system over a network. The integration component includes a non-modifying add-on component to the enterprise application that exposes at least a portion of the second set of functionality of the second version of the network application through the enterprise application.

In a first aspect combinable with the general embodiment, the integration component includes only one or more interfaces, customizing functionality, mapping functionality, and master data delta handling.

In a second aspect combinable with any of the previous aspects, the integration component does not include persistency for transactional and master data, and the integration component does not include user interfaces.

In a third aspect combinable with any of the previous aspects, the integration component does not adhere to accessibility, archiving, and internationalization product standards.

In a fourth aspect combinable with any of the previous aspects, the integration component allows corrections only for existing versions of the enterprise application.

A fifth aspect combinable with any of the previous aspects further includes changing the network application through an upgrade or update to the network application.

A sixth aspect combinable with any of the previous aspects further includes maintaining the integration component and the enterprise application at a substantially constant version based on the change to the network application.

A seventh aspect combinable with any of the previous aspects further includes changing the enterprise application through an upgrade or update to the enterprise application.

An eighth aspect combinable with any of the previous aspects includes maintaining the integration component at a substantially constant version based on the change to the enterprise application.

In a ninth aspect combinable with any of the previous aspects, the enterprise application includes a first enterprise application, and the network application includes a first network application.

In a tenth aspect combinable with any of the previous aspects includes identifying a second enterprise application executable in the first computing environment, the second enterprise application compatible with a first version of a second network application executable in the second computing environment communicably coupled to the first computing environment so that a first set of functionality of the first version of the second network application is exposed through the second enterprise application.

An eleventh aspect combinable with any of the previous aspects further includes identifying a second version of the second network application executable in the second computing environment, the second version of the second network application including a second set of functionality at least partially distinct from the first set of functionality of the second network application.

A twelfth aspect combinable with any of the previous aspects further includes delivering a second integration component from the second computing system to the first computing system over the network, the second integration component including a non-modifying add-on component to the second enterprise application that exposes at least a portion of the second set of functionality of the second version of the second network application through the second enterprise application.

In a thirteenth aspect combinable with any of the previous aspects, the second integration component exposes the second set of functionality to a plurality of versions of the first enterprise application.

In a fourteenth aspect combinable with any of the previous aspects, the first integration component extends and belongs only to the first enterprise application, and the second integration component extends and belongs only to the second enterprise application.

In a fifteenth aspect combinable with any of the previous aspects, the first integration component does not depend on the second integration component, and the second integration component does not depend on the first integration component.

In a sixteenth aspect combinable with any of the previous aspects, each of the first and second integration components comprise an application-specific, non-reusable add-on component to the respective first and second enterprise applications.

In a seventeenth aspect combinable with any of the previous aspects, the integration component is partitioned based on a deployment architecture of the enterprise application.

In an eighteenth aspect combinable with any of the previous aspects, the integration component exposes at least a portion of the first set of functionality of the first version of the network application.

Various embodiments of an integration component in accordance with the present disclosure may include one, some, or all of the following features. For example, an integration component may integrate on-demand technology into existing on-premise infrastructure with relatively low bandwidth use by, for instance, focusing the integration on on-demand application-specific interfaces, which can be delivered quickly enough to support agile on-demand timelines. As another example, an integration component may create and maintain a low entry-barrier to using new or upgraded functionality in an on-demand application for a business enterprise that typically does not update/upgrade its on-premise application to use an additional add-on/service. As another example, an integration component may minimize an impact of additionally required components by decreasing (or slowing a rate of increase of) new code added to an on-premise application, thereby decreasing or maintaining complexity, cost, import times, generation times, additional potential errors, and security issues. Thus, TCO from the business enterprise's perspective may be reduced or maintained. As another example, an integration component may, from the software developer/provider's perspective, maximize flexibility, minimize internal production cost, and decrease customer TCO. For instance, an integration component may maximize flexibility concerning delivery time slots (e.g., on-demand applications are not forced into one sync slot and consumers are not forced to synchronize their delivery). Also, an integration component may help maintain a reasonable cost concerning internal infrastructure while providing minimal maintenance effort. Further, an integration component may enable support of available stable core deployment options by not forcing a business enterprise customer to apply a full stack instead of only selected scenarios.

Various embodiments of an integration component in accordance with the present disclosure may also include one, some, or all of the following features. For example, an integration component may comprise a non-modifying add-on to on-premise enterprise resource planning (ERP) systems (or backend systems in general) that allow for surfacing master data and business data from the backend system required for business processes between the on-demand application and the backend. In some instances, integration into more than one on-premise application can be achieved via multiple integration components. As another example, owners of on-premise systems that have not kept on-premise applications up to date may still adopt leading-edge functionality without having to upgrade the on-premise applications.

These general and specific aspects can be implemented using a device, system or method, or any combinations of devices, systems, or methods. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions. The details of one or more implementations are set forth in the accompanying drawings and the description below. Other features, objects, and advantages will be apparent from the description and drawings, and from the claims.

DESCRIPTION OF DRAWINGS

FIG. 1 illustrates an example distributed computing system including an on-demand application and an on-premise application having an integration component add-on;

DETAILED DESCRIPTION

Figure 1:
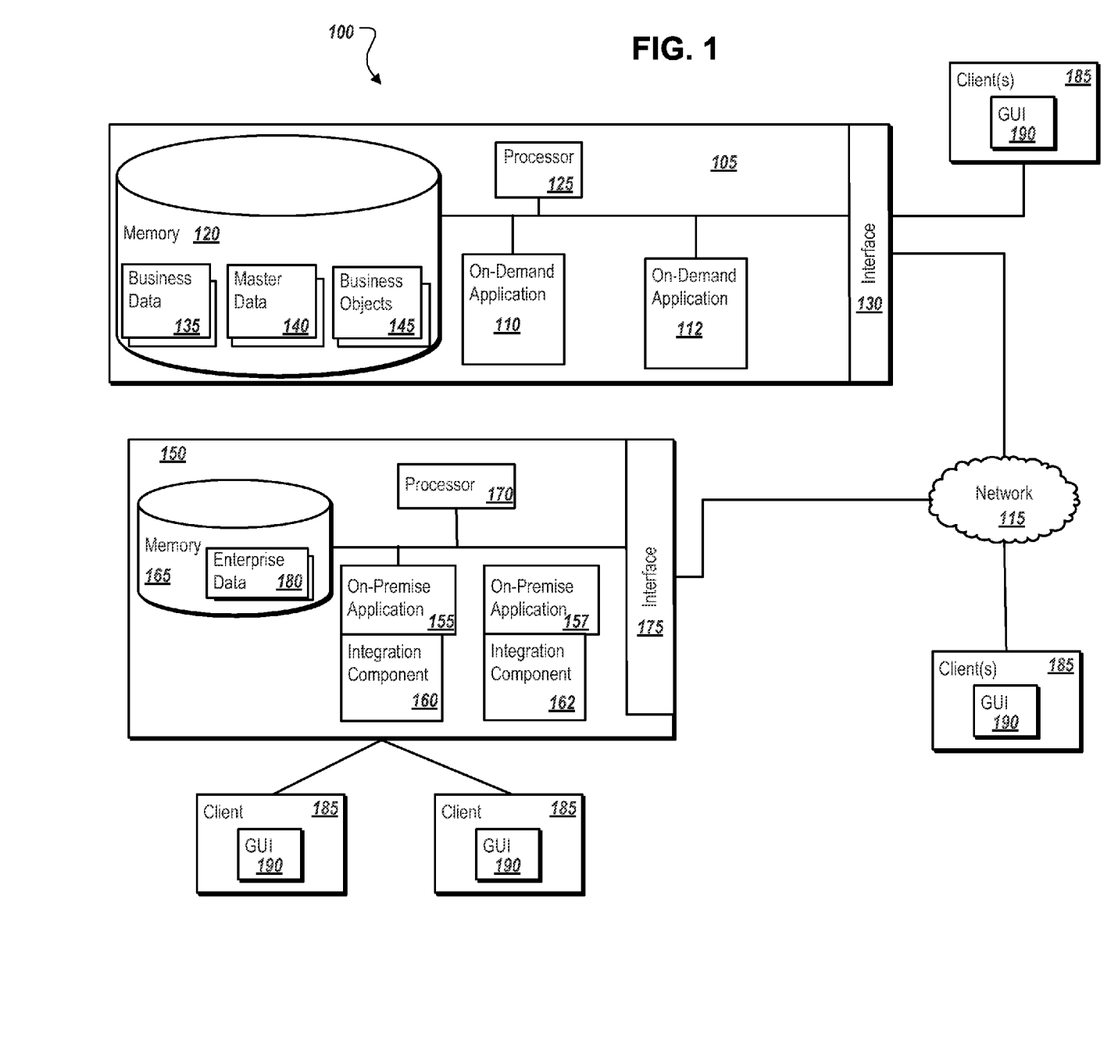

FIG. 1 illustrates an example distributed computing system 100 including one or more on-demand applications 110, 112 executing in a hosted computing environment 105 and one or more on-premise applications 155, 157 executing in an enterprise computing environment 150. As illustrated, each of the on-premise applications 155, 157 include an integration component. On-premise application 155 includes integration component 160 while on-premise application 157 includes integration component 162. Generally, the distributed computing system 100 operates so that information, such as business information, data, applications, functionality and otherwise, are presented to one or more users of the enterprise computing environment 150 over a network 115 communicably coupling the environments 105 and 150. Such exposed business information, data, applications, and functionality may be presented to the users from the on-demand applications 110, 112 and through the on-premise applications 155, 157. In some instances, the presentation of such business information may depend on the integration of particular versions of the on-demand applications 110, 112 with the corresponding on-premise applications 155, 157. For instance, business information and functionality available in on-demand application 110 may only be exposable to a particular version of on-premise application 155. The integration component 160 may expose such business information and functionality available in on-demand application 110 to the on-premise application 155 even without upgrading, updating, or patching the on-premise application 155, thereby reducing complexity and TCO of the enterprise computing environment 150.

Turning to the example implementation of FIG. 1, the illustrated environment 100 includes or is communicably coupled with the hosted computing environment 105, the enterprise computing environment 150, and one or more clients 185, at least some of which communicate across network 115. In general, environment 100 depicts an example configuration of a system capable of providing stateful execution of stateless applications in a substantially transparent way, as well as dynamically determining the particular application's mode of operation in response to requests from its clients 185. Generally, each of the computing environments 105 and 150 may include or communicably couple one or more servers or other computing devices (e.g., computers, laptops, desktops, tablets, mobile phones, smartphones, PDAs, and otherwise) in an integrated environment. Accordingly, the terms "computing environment" and "server" may be used interchangeably without departing from the scope of this disclosure.

In general, each of the hosted server 105 and enterprise server 150 is any server that stores, respectively, one or more on-demand (or "hosted") applications 110,112, and on-premise (or "enterprise") applications 155, 157, where at least a portion of the on-demand applications 110, 112 are executed via requests and responses sent to users or clients within and communicably coupled to the illustrated environment 100 of FIG. 1. In some instances, the hosted server 105 may store a plurality of various on-demand applications 110, 112, while in other instances, the hosted server 105 may be a dedicated server meant to store and execute only a single on-demand application (e.g., 110 or 112). In some instances, the hosted server 105 may comprise a web server, where the on-demand applications 110, 112 represent one or more web-based applications accessed and executed via network 115 by the clients 185 of the enterprise server 150 to perform the programmed tasks or operations of the on-demand applications 110, 112.

The illustrated enterprise server 150 may store a plurality of various enterprise applications 155, 157, while in other instances, the enterprise server 150 may be a dedicated server meant to store and execute only a single enterprise application (e.g., 155 or 157). In some instances, the enterprise server 150 may comprise a networked server in a business enterprise, where the enterprise applications 155, 157 represent one or more network or web-based applications accessed and executed via an internal enterprise network, for example, by the clients 185 to perform the programmed tasks or operations of the enterprise applications 155, 157.

At a high level, each of the hosted server 105 and the enterprise server 150 comprise an electronic computing device operable to receive, transmit, process, store, or manage data and information associated with the environment 100. Specifically, the hosted server 105 and enterprise server 150 illustrated in FIG. 1 may operate to receive application requests from one or more of the enterprise applications 155, 157 associated with the clients 185 of environment 100, respond to the received requests by processing said requests in the associated on-demand application 110, 112, and send the appropriate response from the on-demand application 110, 112 back to the requesting enterprise applications 155, 157.

In addition to requests from the external clients 185 illustrated in FIG. 1, requests associated with the on-demand applications 110, 112 may also be sent from internal users, external or third-party customers, other automated applications, as well as any other appropriate entities, individuals, systems, or computers. As used in the present disclosure, the term "computer" is intended to encompass any suitable processing device. For example, although FIG. 1 illustrates a single hosted computing environment 105, environment 100 can be implemented using two or more hosted computing environments 105, as well as computers other than servers, including a server pool. Likewise, although FIG. 1 illustrates a single enterprise computing environment 150, environment 100 can be implemented using two or more enterprise computing environments 150, as well as computers other than servers, including a server pool.

Each of the hosted server 105 and enterprise server 150 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, the illustrated servers 105 and 150 may be adapted to execute any operating system, including Linux, GNU/Linux. UNIX, Windows, OSX, or any other suitable operating system.

In the present implementation, and as shown in FIG. 1, the hosted server 105 includes a processor 125, an interface 130, a memory 120, and the one or more on-demand applications 110, 112. The enterprise server 150 includes a processor 170, an interface 175, a memory 165, and the one or more on-premise applications 155, 157. Each interface 130, 175 is used by the respective server 105, 150 for communicating with other systems in a client-server or other distributed environment (including within environment 100) connected to the network 115 (e.g., client 185, as well as other systems communicably coupled to the network 115). Generally, the interfaces 130, 175 comprise logic encoded in software and/or hardware in a suitable combination and operable to communicate with the network 115. More specifically, the interfaces 130, 175 may comprise software supporting one or more communication protocols associated with communications such that the network 115 or interface's hardware is operable to communicate physical signals within and outside of the illustrated environment 100.

Generally, the network 115 facilitates wireless or wireline communications between the components of the environment 100 (i.e., between the servers 105 and 150 and the clients 185), as well as with any other local or remote computer, such as additional clients, servers, or other devices communicably coupled to network 115 but not illustrated in FIG. 1. The network 115 is illustrated as a single network in FIG. 1, but may be a continuous or discontinuous network without departing from the scope of this disclosure, so long as at least a portion of the network 115 may facilitate communications between senders and recipients. The network 115 may be all or a portion of an enterprise or secured network, while in another instance at least a portion of the network 115 may represent a connection to the Internet. In some instances, a portion of the network 115 may be a virtual private network (VPN), such as, for example, the connection between the client 185 and the servers 105 and/or 150. Further, all or a portion of the network 115 can comprise either a wireline or wireless link. Example wireless links may include 802.11 a/b/g/n, 802.20, WiMax, and/or any other appropriate wireless link. In other words, the network 115 encompasses any internal or external network, networks, sub-network, or combination thereof operable to facilitate communications between various computing components inside and outside the illustrated environment 100. The network 115 may communicate, for example, Internet Protocol (IP) packets, Frame Relay frames, Asynchronous Transfer Mode (ATM) cells, voice, video, data, and other suitable information between network addresses. The network 115 may also include one or more local area networks (LANs), radio access networks (RANs), metropolitan area networks (MANs), wide area networks (WANs), all or a portion of the Internet, and/or any other communication system or systems at one or more locations.

As illustrated in FIG. 1, the hosted server 105 includes the processor 125, while the enterprise server 150 includes the processor 170. Although illustrated as single processors in each server in FIG. 1, two or more processors may be used according to particular needs, desires, or particular embodiments of environment 100. Each processor 125, 170 may be a central processing unit (CPU), a blade, an application specific integrated circuit (ASIC), a field-programmable gate array (FPGA), or another suitable component. Generally, the processor 125, 170 executes instructions and manipulates data to perform the operations of the respective server 105, 150 and, specifically, the one or more plurality of on-demand applications 110, 112 or on-premise applications 155, 157. Specifically, each processor 125, 170 executes the respective functionality required to receive and respond to requests from the clients 185 and their respective client applications (e.g., on-premise applications 155, 157), as well as the functionality required to perform the other operations of the on-demand application 110, 112.

Regardless of the particular implementation, "software" may include computer-readable instructions, firmware, wired or programmed hardware, or any combination thereof on a tangible medium operable when executed to perform at least the processes and operations described herein. Indeed, each software component may be fully or partially written or described in any appropriate computer language including C, C++, Java, Visual Basic, ABAP (Advanced Business Application Programming), assembler, Perl, any suitable version of 4GL, as well as others. It will be understood that while portions of the software illustrated in FIG. 1 are shown as individual modules that implement the various features and functionality through various objects, methods, or other processes, the software may instead include a number of sub-modules, third party services, components, libraries, and such, as appropriate. Conversely, the features and functionality of various components can be combined into single components as appropriate.

At a high level, each of the on-demand applications 110, 112 and each of the on-premise applications 155, 157 is any application, program, module, process, or other software that may execute, change, delete, generate, or otherwise manage information according to the present disclosure, particularly in response to and in connection with one or more requests received from the illustrated clients 185. In certain cases, only one on-demand application 110, 112 may be located at a particular hosted server 105. Likewise, only one on-premise application 155, 157 may be located at a particular enterprise server 105. In others, a plurality of related and/or unrelated on-demand applications 110, 112 may be stored at a single hosted server 105, or located across a plurality of other servers 105, as well. A plurality of related and/or unrelated on-premise applications 155, 157 may be stored at a single enterprise server 150, or located across a plurality of other servers 150, as well.

In certain cases, one or more of the applications illustrated in the environment 100 may implement a composite application. For example, portions of the composite application may be implemented as Enterprise Java Beans (EJBs) or design-time components may have the ability to generate run-time implementations into different platforms, such as J2EE (Java 2 Platform, Enterprise Edition), NetWeaver, ABAP Web Application Server, or Microsoft's .NET, among others. Additionally, each application may represent a web-based application accessed and executed by remote clients 185 via the network 115 (e.g., through the Internet). Further, while illustrated as internal to their respective servers, one or more processes associated with an application may be stored, referenced, or executed remotely.

The hosted server 105 also includes memory 120, while the enterprise server 150 include memory 165. Each memory 120, 165 may include any memory or database module and may take the form of volatile or non-volatile memory including, without limitation, magnetic media, optical media, random access memory (RAM), read-only memory (ROM), removable media, or any other suitable local or remote memory component. Memory 120, 165 may store various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the respective server 105, 150 and its one or more on-demand applications 110, 112 or on-premise applications 155, 157. Additionally, each memory 120, 165 may include any other appropriate data, such as VPN applications, firmware logs and policies, firewall policies, a security or access log, print or other reporting files, as well as others.

As illustrated, memory 120 stores business data 135, master data 140, and business objects 145. The business data 135 may include parameters, pointers, variables, algorithms, instructions, rules, files, links, or other data for easily providing information associated with or to facilitate a business solution to the clients 185 through the system 100. For example, business data 135 may, generally, include business information regarding enterprise customers, sales, revenue, costs, suppliers, vendors, business hierarchy, organizational information, employee data, and other business data used by a business enterprise to conduct day-to-day and extended business workflow. Master data 140 may include, for example, business data that does not change or is held relatively constant.

Each business object 145 may include a business object model that defines the business-related concepts at a central location for a number of business transactions. In other words, it reflects the decisions made about modeling the business entities of the real world acting in business transactions across industries and business areas. The business object model is defined by the business objects and their relationship to each other (the overall net structure).

Each business object 145 is thus a capsule with an internal hierarchical structure, behavior offered by its operations, and integrity constraints. Business objects 145 are generally semantically disjointed, i.e., the same business information is represented once. In some embodiments, the business objects 145 are arranged in an ordering framework such that they can be arranged according to their existence dependency to each other. For example, in a modeling environment, the customizing elements might be arranged on the left side of the business object model, the strategic elements might be arranged in the center of the business object model, and the operative elements might be arranged on the right side of the business object model. Similarly, the business objects can be arranged in this model from the top to the bottom based on defined order of the business areas, e.g., finance could be arranged at the top of the business object model with customer relationship management (CRM) below finance and supplier relationship management (SRM) below CRM. To help ensure the consistency of interfaces, the business object model may be built using standardized data types as well as packages to group related elements together, and package templates and entity templates to specify the arrangement of packages and entities within the structure.

A business object 145 may be defined such that it contains multiple layers. For example, a business object 145 may contain a kernel layer, a integrity layer, an interface layer, and an access layer. The innermost layer of the example business object is the kernel layer. The kernel layer represents the business object's inherent data, containing various attributes of the defined business object. The second layer represents the integrity layer. The integrity layer contains the business logic of the object. Such logic may include business rules for consistent embedding in the environment 100 and the constraints regarding the values and domains that apply to the business object 145. Business logic may comprise statements that define or constrain some aspect of the business, such that they are intended to assert business structure or to control or influence the behavior of the business entity. It may pertain to the facts recorded on data and constraints on changes to that data. In effect, business logic may determine what data may, or may not, be recorded in business object 145. The third layer, the interface layer, may supply the valid options for accessing the business object 145 and describe the implementation, structure, and interface of the business object to the outside world. To do so, the interface layer may contain methods, input event controls, and output events. The fourth and outermost layer of the business object 145 is the access layer. The access layer defines the technologies that may be used for external access to the business object's 145 data. Some examples of allowed technologies may include COM/DCOM (Component Object Model/Distributed Component Object Model), CORBA (Common Object Request Broker Architecture), RFC (Remote Function Call), Hypertext Transfer Protocol (HTTP) and Java, among others. Additionally, business objects 145 of this embodiment may implement standard object-oriented technologies such as encapsulation, inheritance, and/or polymorphism.

The illustrated environment of FIG. 1 also includes one or more clients 185. As illustrated, in this embodiment of the environment 100, there is one or more clients 185 associated with the enterprise server 150, one or more clients 185 associated with the hosted computing environment 105, as well as one or more clients 185 communicably coupled with one or both of the enterprise server 150 and hosted computing environment 105 through the network 115. Each client 185 may be any computing device operable to connect to or communicate with at least the enterprise server 150 and/or via the network 115 using a wireline or wireless connection. Typically, each client 185 includes a processor, an interface, a memory, and a graphical user interface (GUI) 190. In general, each client 185 includes an electronic computer device operable to receive, transmit, process, and store any appropriate data associated with the environment 100 of FIG. 1. It will be understood that there may be any number of clients 185 associated with, or external to, environment 100. For example, while illustrated environment 100 includes two clients, alternative implementations of environment 100 may include a single client 185 communicably coupled to the enterprise server 150, or any other number suitable to the purposes of the environment 100.

Additionally, there may also be one or more additional clients 185 external to the illustrated portion of environment 100 that are capable of interacting with the environment 100 via the network 115. Further, the term "client" and "user" may be used interchangeably as appropriate without departing from the scope of this disclosure. Moreover, while each client 185 is described in terms of being used by a single user, this disclosure contemplates that many users may use one computer, or that one user may use multiple computers. As used in this disclosure, client 185 is intended to encompass a personal computer, touch screen terminal, workstation, network computer, kiosk, wireless data port, smartphone, personal data assistant (PDA), one or more processors within these or other devices, or any other suitable processing device. For example, each client 185 may comprise a computer that includes an input device, such as a keypad, touch screen, mouse, or other device that can accept user information, and an output device that conveys information associated with the operation of the enterprise server 150 (and on-premise applications 155, 157) or the client 185 itself, including digital data, visual information, or the GUI 190. Both the input and output device may include fixed or removable storage media such as a magnetic storage media, CD-ROM, or other suitable media to both receive input from and provide output to users of the clients 185 through the display, namely, the GUI 190.

Further, the illustrated client 185 includes a GUI 190 that includes a graphical user interface operable to interface with at least a portion of environment 100 for any suitable purpose, including generating a visual representation of the on-premise applications 155, 157 (in some instances, the client's web browser) and the interactions with the on-demand application 110, 112, including the responses received from the on-demand application 110, 112 received in response to the requests sent by the client application 144.

Generally, through the GUI 190, the user is provided with an efficient and user-friendly presentation of data provided by or communicated within the system. The term "graphical user interface," or GUI, may be used in the singular or the plural to describe one or more graphical user interfaces and each of the displays of a particular graphical user interface. Therefore, the GUI 190 can represent any graphical user interface, including but not limited to, a web browser, touch screen, or command line interface (CLI) that processes information in environment 100 and efficiently presents the information results to the user. In general, the GUI 190 may include a plurality of user interface (UI) elements, some or all associated with the enterprise applications 155, 157, such as interactive fields, pull-down lists, and buttons operable by the user at client 185. These and other UI elements may be related to or represent the functions of the enterprise applications 155, 157, as well as other software applications executing at the client 185. In particular, the GUI 190 may be used to present the client-based perspective of the on-demand application 110, 112, and may be used (as a web browser or using the enterprise applications 155, 157 as a web browser) to view and navigate the on-demand application 110, 112, as well as various web pages located both internal and external to the server, some of which may be associated with the on-demand application 110, 112. For purposes of the present location, the GUI 190 may be a part of or the entirety of the enterprise applications 155, 157, while also merely a tool for displaying the visual representation of the client and on-demand applications' 110, 112 actions and interactions. In some instances, the GUI 190 and the enterprise applications 155, 157 may be used interchangeably, particularly when the enterprise applications 155, 157 represents a web browser associated with the on-demand application 110, 112.

In some embodiments of the system 100, each on-demand application may work with a corresponding on-premise application to deliver an integrated, hybrid solution to a user, such as one or more of the clients 185. The combination of the on-demand application and on-premise application in one end-to-end scenario may provide a hybrid operation model of an end-to-end solution, in which the clients 185 may combine the stability of the functionality of the on-premise application, which may be upgraded or updated infrequently, with the flexibility of new functionality available through on-demand applications. But due, at least in part, to the fundamentally different release and maintenance strategies of on-premise and on-demand applications, a hybrid solution may require a joint approach of all involved components regarding release frequency and maintenance. For example, the on-demand application as a part of a hybrid solution may need to be compatible with all earlier on-premise application versions. In contrast, functionality exposed by newer versions of the on-demand application may be important to the clients 185, but not critical so as to require an upgrade to a new on-premise application version.

As illustrated, each on-premise application 155, 157 includes a corresponding integration component 160, 162, respectively. Each integration component 160, 162 may expose various business functionality from the corresponding on-demand application 110, 112 through the on-premise application 155, 157. As one example, integration component 160 may expose functionality available through the on-demand application 110 through the on-premise application 155 that would not be otherwise available through the on-premise application 155. Likewise, integration component 162 may expose functionality available through the on-demand application 112 through the on-premise application 157 that would not be otherwise available through the on-premise application 157. Alternatively, or additionally, the on-premise application 155, 157 may expose business functionality to the corresponding on-demand application 110, 112 by means of integration components 160, 162. Such functionality may not be otherwise available because, for instance, the particular version of each of the on-premise applications 155, 157 may not be compatible with the respective on-demand applications 110, 112 to expose that functionality. Further, legal changes that occur after shipment of a relevant release of the on-premise application 155, 157 may cause an incompatibility between such applications and a corresponding one of the on-demand application 110, 112, which may be corrected by the integration component 160, 162, respectively.

For example, on-demand application 110 may be the most up-to-date on-demand application in a hybrid solution implemented by the combination of the on-demand application 155 and on-premise application 110, while the on-premise application 110 may be a slightly older version of the on-premise application. Although a new version of the on-premise application 155 may be available that exposes all of the new functionality available in the on-demand application 110, an upgrade or change to the new version of the on-premise application 155 may add complexity, TCO, and further expand the code base for the business enterprise operating the enterprise server 150. Further, the business enterprise may not need or want all of the new functionality available in the newest version of the on-demand application 110. The integration component 160 may expose just a subset of the total functionality available from the newest version of the on-demand application 110 while minimizing complexity and TCO for the business enterprise.

In some embodiments, each of the illustrated integration components 160, 162 may be a non-modifying add-on to on-premise application (or backend systems in general) that allows for surfacing master data and business data from the on-premise application (such as the enterprise business data 180) required for business processes between the on-demand application and the on-premise application. In some aspects, an integration component that is provided before the corresponding on-demand application version is available may be designed in such a way that it can integrate with previous on-demand application versions (that is, the version currently running), thus introducing the additional requirement of upward compatibility.

As described above, each integration component may be an add-on to an on-premise application that provides all of the functionality that is necessary to integrate an on-demand application version with a respective on-premise application version. In some embodiments, the integration component is a small unit that includes only interfaces (integration points), customizing, mapping functionality, master data delta handling. Further, the integration component may be modification-free and may not, in some cases: include persistency for transactional and master data (although customizing tables may be allowed via the integration component); include user interfaces; or reuse other integration components. In other words, such restrictions may ensure that upgrades run as smooth as possible, while focusing on adding features without burdens such as, for example, retesting.

In some embodiments, an integration component may be preferable when a business case justifies a cost of production of the integration component (as opposed to cost to upgrade or update the on-premise application). Further, an integration component may be preferable to an on-premise application upgrade or update when an enterprise computing environment does not expose integration points to already existing and appropriate functionality of the on-demand application.

In some embodiments, implementation of a particular integration component may include shipping the integration component in a dedicated software component with only one version. Further, extensions of interfaces may be shipped via new software components, although corrections are allowed in the original software component.

In some embodiments, independence of a lifecycle between an on-demand application, an integration component, and an on-premise application is achieved. For example, independence may be achieved, because on-demand application upgrades or updates may not require the integration component and/or the on-premise application to update or upgrade. Further, on-premise application updates or upgrades may not require the integration component to update or upgrade. Further, independence may also introduce a desirable side-effect: existing lifecycle management tools can be continued to be used as before, since they don't have to take into account a 'hybrid' lifecycle. In some embodiments, the on-demand application is compatible to a particular integration component for at least the period of time for which a license for the on-demand application is valid (e.g., 2 years or more).

In some embodiments, an integration component may deliver only missing interfaces to an installed on-premise application to allow integration of already delivered products with new on-demand application services (e.g., functionality). The integration component may maintain one or more boundary conditions. For example, integration components may only deliver interfaces but no business functionality. For instance, instead of shipping full-featured on-premise applications, the integration component delivers only missing interfaces to the on-premise application. This may allow a software provider to deliver very small and non-disruptive components.

As another example, the integration component may be completely modification free. For example, the integration component may not modify any existing code of other software components (e.g., other on-premise applications). Modifications may result in dramatically increasing total cost of implementation (TCI), and TCO. Further, allowing no modifications may also mean that the integration component may not change the behavior of the enterprise system in a way that the enterprise system would not be able to run in a consistent state after a possible removal of the integration component.

As another example, the integration component may be a small, on-demand application specific component. For example, each integration component may be a software component based on a relevant deployment option that it extends. The integration component may belong to one and only one on-demand application. Thus, the integration component is on-demand application-specific while having a unique connection to the software components of on deployment option. The integration component further may not depend on an integration component of another on-demand application. However, an integration component may be built on other integration component of the same on-demand application.

Based on the above, the content of an integration component is specific for that respective on-demand application, which means that an on-demand application may not require the integration component of another on-demand application. As a consequence, individual integration points may be implemented in disjoint packages and may be configured separately even in cases when several on-demand applications need to access the same business object or business application in the same way.

As another example, an integration component may not include any user interfaces for business purposes dedicated to the end user role. For example, in order to minimize required deliverables for UI technology, complexity through on-demand to on-premise user interface calls, integration components may not provide UIs (e.g., other than a specified set of GUI screen). This may allow a software developer to skip certain production process steps in an integration component assembly phase (e.g., usability, accessibility, and platform specific topics with special UI technologies, such as Flash/Silverlight), making release of the integration component to market faster. Further, it may be possible to deliver UIs for configuration purposes dedicated to an administrator role. These UIs may be implemented in a simple, production-friendly UI technology imposed by the integration component governance but not being subject to the claims.

As another example, an integration component may not use any persistency, which requires archiving (persistence for buffering is possible, but no transactional data for instance). This may allow a software developer to skip platform specific (operating system and database) process steps in the assembly phase, making release of the integration component to market faster. Further, this may also help meet a goal of not leaving the system in an inconsistent state, even if the integration component would be undeployed at a later point in time.

As previously described, in some embodiments, an integration component may be a small on-demand application-specific component extending only one deployment option of one underlying product version. For example, while one integration component may be used to access one or more components of a particular deployment option for an enterprise application, two integration components may be needed for integrating to two different deployment options of the enterprise applications. For example, if the on-premise applications consist of two (or more) major components, one deployment option would be to have both deployed on the same computing environment. The other deployment option is to deploy the two components in two different systems. In this case, the interfaces exposed by the integration component(s) account for this split architecture, meaning that the integration component is actually split into two parts such that they can be deployed according to the unified or disjoint deployment option chosen for the enterprise application. In the same way, two different on-demand applications extending the same component require different integration components to do so.

In some embodiments, every integration component installed in an enterprise computing environment may follow the same or similar requirements to the underlying enterprise applications (e.g., release and support package level of underlying component). This may, for instance, help ensure that maintenance cost will not increase over time and help ensure that an enterprise maintains a low TCO throughout the lifecycle. Further, to help meet requirements on reasonable cost and development and test efforts, a central landscape may be used for all integration components, reusing as many systems of already existing landscapes as possible. This may minimize the creation of complete landscapes for each integration component, which may normally occur for add-on software components. For example, each integration component development landscape may use only one development system and one maintenance system. Both systems may have their own consolidation system, to allow most flexible assembly phases. This may allow for flexibility for an initial shipment of an integration component. An integration component may only be developed in the corresponding development system before its initial delivery. After its initial delivery, only compatible corrections may be allowed in the correction system. The development system may not allow modifications of an already shipped integration component. Newly developed functionality may only be added to the component in separate software components.

While FIG. 1 is described as containing or being associated with a plurality of elements, not all elements illustrated within environment 100 of FIG. 1 may be utilized in each alternative implementation of the present disclosure. Additionally, one or more of the elements described herein may be located external to environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Figure 2:
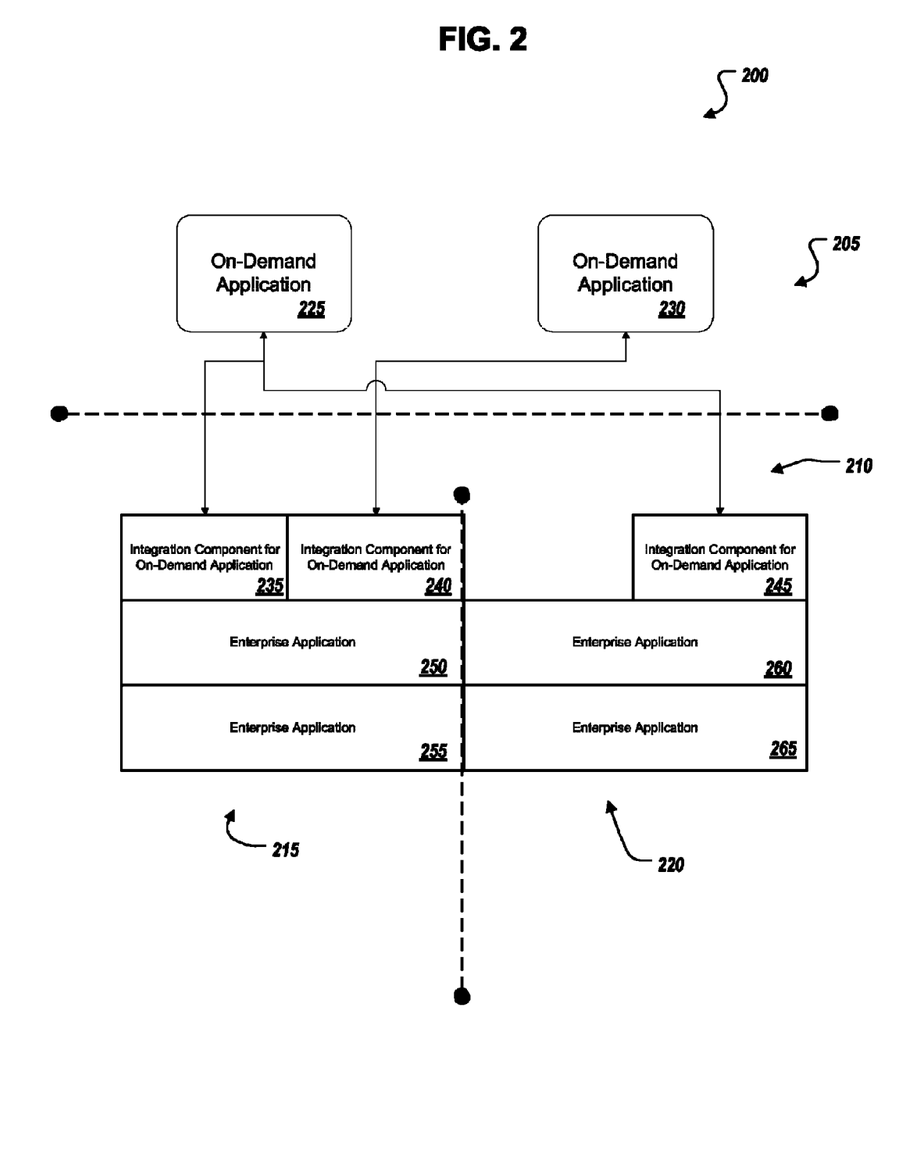
FIG. 2 illustrates a block diagram showing two integration components extending two different deployment options/versions of an on-premise application in a hybrid solution with two network applications.

FIG. 2 illustrates a block diagram 200 showing two integration components extending two different deployment options/versions of an on-premise (e.g., enterprise) application in a hybrid solution with two network (e.g., on-demand) applications. As illustrated, on-demand applications 225, 230 execute in a hosted environment 205, while enterprise applications 250, 255, 260, and 265. The enterprise applications 250, 255, 260, and 265 are divided into deployment options 215 and 220.

As further illustrated, integration components 235, 240, 245 may be add-ons to the enterprise applications 250, 255, 260, and 265 in order to integrate such applications with the on demand applications 225, 230. For example, as illustrated, integration component 235 and 245 may be identical or substantially similar and may be used to extend on-premise application 225. However, two different integration components, here integration component 235 and integration component 240, may be needed to extend both on-demand application 225 and on-demand application 230.

Figure 3:
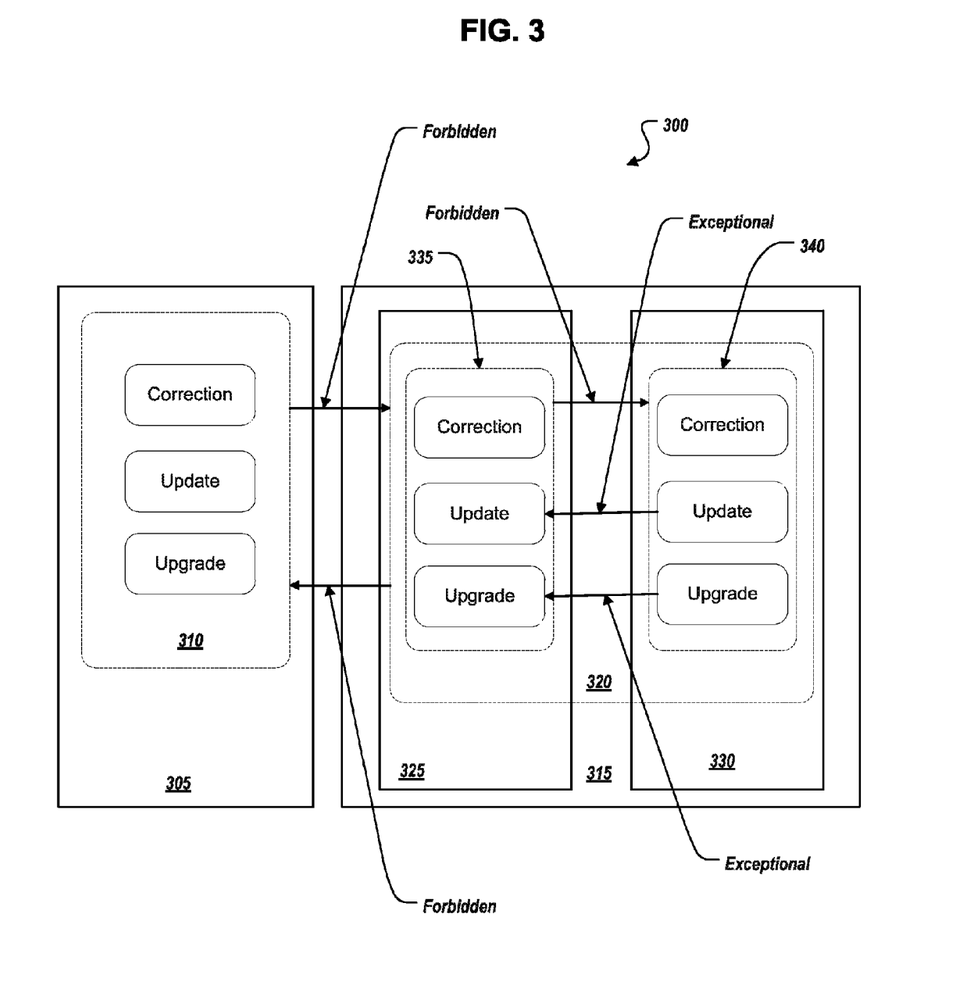
FIG. 3 illustrates an example lifecycle of an integration component in a hybrid solution.

FIG. 3 illustrates an example activity diagram 300 (i.e., UML activity diagram) of an integration component in a hybrid solution. For example, in some embodiments, the diagram 300 of an integration component may be expressed in terms of its correction (e.g., applying one or more notes), update (e.g., deploying a successor support package of the currently deployed product version), and upgrade (e.g., deploying a successor product version) activities, as shown in this figure. The illustrated diagram 300 includes an on-demand environment 305 having on-demand activity 310; and an on-premise environment 315 having an integration component 325 with integration component activity 335 and an enterprise (e.g., backend) application 330 having enterprise activity 340.

As illustrated, the lifecycle activities (update, upgrade, correction) carried out at each of the participating entities (305, 325, 330) may not depend on each other (as illustrated by the forbidden-arrows). This means, in some embodiments, that an upgrade of the on demand software 305 can be carried out independently from the update of the integration component 325. This also may mean that an update of the integration component 325 is independent from the upgrade of enterprise application 330. There are two exceptions depicted (e.g., as illustrated with the exceptional arrows): the upgrade or the update of the integration component 325 may be introduced due to an upgrade or update of the underlying enterprise application 330.

Diagram 300 of an integration component may be governed by one or more rules. For example, an on-demand application may not force a business enterprise to change infrastructure/setup after upgrade/update of an on-premise application, in order to, for example, minimize enterprise TCO. Further, new versions of on-demand applications may ensure interoperability to existing (older) integration components for at least two years. In some instances, new versions of on-demand applications must ensure interoperability to existing (older) integration components for at least two years. Business enterprises, therefore, may not be forced to upgrade the integration components just because the on-demand application was upgraded to a newer version.

As another example rule, all on-demand applications may implement the same generic mechanism, which provides information about the distribution of integration component versions deployed to the on-premise back-end systems.

As another example rule, an on-demand application may require an update/upgrade of the integration component or activating new functionality. For instance, new functionality may require newer versions of the already running software.

As another example rule, an integration component update may not require an update of a backend stack of an enterprise computing environment. For instance, updates of the backend may require preparation, testing, downtimes, that increases TCO and is not acceptable to only update an integration component.

As another example rule, on-premise components may not force an update on the on-demand side. For example, the on-demand side may be updated in a compatible way, then the on-premise side can use the new interfaces. This is because an on-demand cost model may collapse if business enterprises forced the service provider to keep certain releases.

As another example rule, a backend update may not require an integration component update and interfaces between backend and integration component shall stay stable. For instance, interfaces between enterprise applications and integration components should remain stable and minimize cross-dependencies as much as possible, to avoid unforeseen challenges for the business enterprise when updating.

As another example rule, a backend upgrade may require an upgrade of the integration component, but may still need to provide at least the same functionality. For example, TCO would increase if a business enterprise is forced to adapt its business scenario due to an upgrade of a backend system. Also impact towards the on-demand software due to changed interfaces may not be acceptable. Upgrade of the integration component may be forced if internal backend structures, now surfaced via the integration component, have changed and need to be followed.

As another example, an integration component may not have any cross-dependencies with other add-on components and may not have requirements towards running business scenarios (activated industries, business functions, etc.). In some cases, modeling such dependencies may be difficult for a software provider, because, for example, arbitrary dependencies between integration components are difficult to manage. Further, such dependencies, if manageable, may increase TCO, minimize flexibility of delivery options, and minimize installation requirements.

Figure 4:
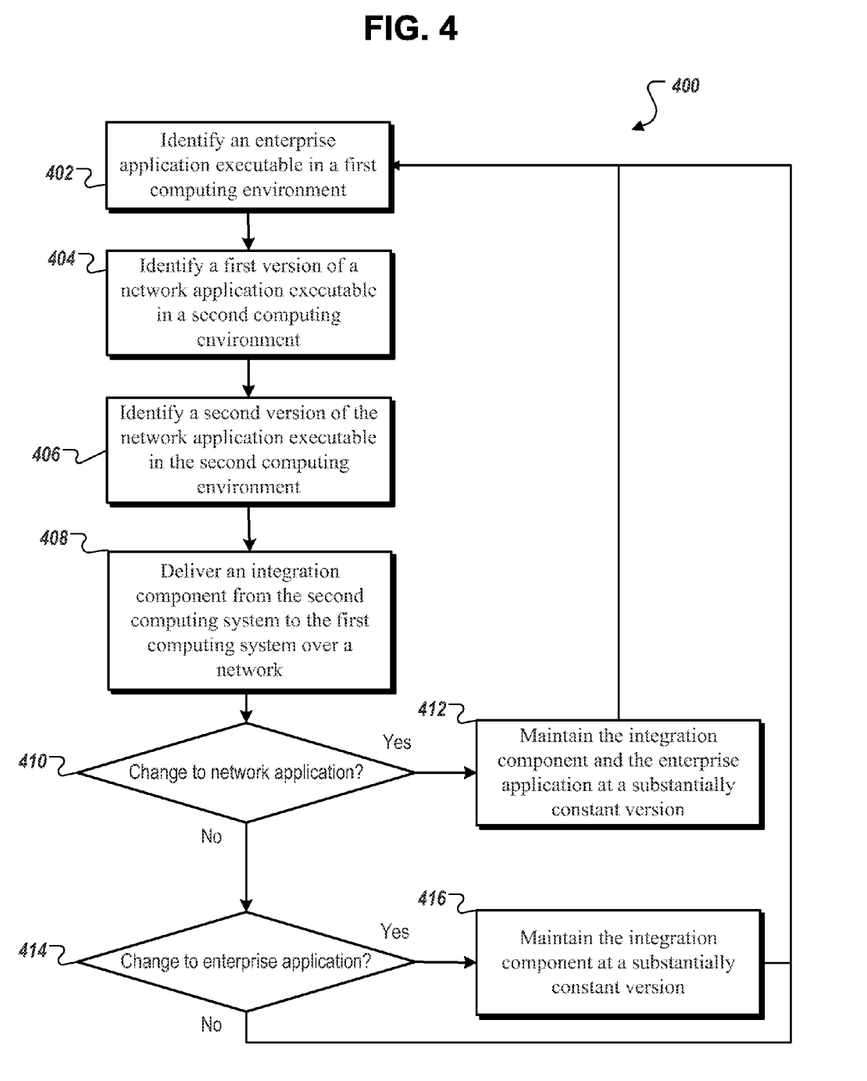
FIG. 4 illustrates an example method for delivery of an integration component in a hybrid solution.

FIG. 4 illustrates an example method 400 for delivery of an integration component in a hybrid solution, such as a distributed computing environment including a network (e.g., hosted or on-demand) application integrated with an enterprise (e.g., on-premise) application to deliver a business solution to one or more users at a business enterprise. For example, method 400 may be implemented on or by the distributed computing system 100 shown in FIG. 1.

Method 400 may begin at step 402. In step 402, an enterprise application executable in a first computing environment is identified. The first computing environment, in some embodiments, may all or part of be an enterprise environment (e.g., enterprise computing environment 150). The enterprise application may be identified by, for example, an automatic process implemented on the first computing environment, an automatic process implemented on another computing environment communicably coupled to the first computing environment (such as a network computing environment), or by a user or administrator at the first computing environment.

In step 404, a network application executable in a second computing environment is identified. In some embodiments, a particular version of the network application is identified, which is compatible with the enterprise application. The particular version of the network application exposes particular business functionality to the user through the enterprise application. In some embodiments, the second computing environment may be a software service provider, or software developer computing system in which a hosted application (e.g., the network application) may be executed.

In step 406, another version of the network application executable in the second computing environment is identified. For example, the other version may be an updated or upgraded version of the particular version identified in step 404. The other (e.g., newer) version of the network application may include functionality different than (or in addition to) the particular business functionality exposed by the particular version of the network application identified in step 404.

In step 408, an integration component is delivered from the second computing environment to the first computing system over a network. "Delivery," in some instances, may include the enterprise customer downloading the integration component and installing it on the first computing system (e.g., enabled by an on-demand license). Thus, delivery may include making the integration component available for download from the second computing system. The integration component, in some embodiments, may be a non-modifying add-on component to the enterprise application that exposes at least a portion of the functionality different than (or in addition to) the particular business functionality exposed by the particular version of the network application identified in step 404. For example, the integration component may be the same as or similar to the integration components 160, 162 described with reference to FIG. 1. In some embodiments, the integration component delivered to the first computing system may include only one or more interfaces, customizing functionality, mapping functionality, and master data delta handling without modifying the enterprise application. Further, for example, the integration component may not include persistency for transactional or master data or UIs.

In step 410, a determination is made whether there is a change (e.g., update, upgrade, correction, patch) to the network application. If the determination is yes, then, at step 412, the integration component and the enterprise application is maintained at a substantially constant version without changes. If the determination is no, then method 400 may continue to step 414.

In step 412, a determination is made whether there is a change (e.g., update, upgrade, correction, patch) to the enterprise application. If the determination is yes, then, at step 416, the integration component is maintained at a substantially constant version without changes. If the determination is no, then method 400 may continue to step 402 to identify additional enterprise applications. For example, there may be multiple enterprise applications executing in the first computing system (as well as multiple network applications executing in the second computing environment). Thus, in some embodiments, method 400 may repeat all or many of the illustrated steps. Additional delivered integration components may, for example, be independent of previously-delivered integration components in that each delivered integration component belongs to one and only one network application. Further, none of the delivered integration components may depend on other delivered integration components. Thus, each integration component may be an application-specific, non-reusable add-on component to its respective enterprise application.

Once an integration component has been delivered, additional interfaces (or modifications of existing interfaces) may be required or desired. In some embodiments, multiple supported versions of a particular integration component may be allowed; alternatively, multiple supported versions may not be allowed. Instead of delivering multiple versions of a particular integration component, for example, completely new integration components or support packages of already-delivered integration component may be delivered.

In some cases, each change of the integration components which are delivered may result in a new version of the integration component product version. For instance, with respect to patching, the integration component software component versions can be included in the new product version with a higher support package level than the previous product version. The patch version of the integration component may only contain corrections or completely compatible changes to already existing interfaces. Thus, patched integration component software component versions may only be included in a new integration component product version (e.g., the newest).

In the case of new interfaces, these new interfaces may be included in completely new integration components. This may stabilize existing interfaces, prepare them for retrofits, and allow business enterprises to keep very small components if they do not activate additional functionality in their on-demand service.

This handling of additional interfaces may allow for maintenance and regression testing effort to be minimized, due to a minimal number of parallel codelines (e.g., only have one integration component product version in production) and usage of automated test.

While not incrementing the version number of integration components themselves, the version number of the product which delivers the new integration components, can be incremented whenever additional integration components need to be delivered. Further, when shipping a new product version of a product, it can make sense to also include the newest support package of the other integration components that are included in the product to allow the newest corrections to also be delivered to the enterprise environment. Furthermore, the newest support package of an integration component may be included due to compatible changes being done in those integration components.

A number of implementations have been described. Nevertheless, it will be understood that various modifications can be made. For example, other methods described herein besides those, or in addition to those, illustrated in FIG. 4 can be performed. Further, the illustrated steps of method 400 can be performed in different orders, either concurrently or serially. Further, steps can be performed in addition to those illustrated in method 400, and some steps illustrated in method 400 can be omitted without deviating from the present disclosure. Accordingly, other implementations are within the scope of the following claims.

What is claimed is:

1. A method performed with a computing system for integrating software applications, the method comprising:
   identifying at least one enterprise application executable in a first computing environment, the enterprise application compatible with a first version of a network application executable in a second computing environment communicably coupled to the first computing environment so that a first set of functionality of the first version of the network application is exposed through the enterprise application;
   identifying a second version of the network application executable in the second computing environment, the second version of the network application comprising a second set of functionality at least partially distinct from the first set of functionality; and
   delivering an integration component from the second computing system to the first computing system over a network, the integration component comprising an application specific, non-reusable and non-modifying add-on component that is uniquely associated with the enterprise application and exposes at least a portion of the second set of functionality of the second version of the network application through the enterprise application, the integration component configured to maintain an execution of the enterprise application without retesting.

2. The method of claim 1, wherein the integration component comprises only one or more interfaces, customizing functionality, mapping functionality, and master data delta handling.

3. The method of claim 2, wherein the integration component does not include persistency for transactional and master data, and the integration component does not include user interfaces.

4. The method of claim 3, wherein the integration component does not adhere to accessibility, archiving, and internationalization product standards.

5. The method of claim 3, wherein the integration component allows corrections only for existing versions of the enterprise application.

6. The method of claim 1, further comprising:
   changing the network application through an upgrade or update to the network application; and maintaining the integration component and the enterprise application at a substantially constant version based on the change to the network application.

7. The method of claim 6, further comprising:
changing the enterprise application through an upgrade or update to the enterprise application; and
maintaining the integration component at a substantially constant version based on the change to the enterprise application.

8. The method of claim 1, wherein the enterprise application comprises a first enterprise application, the integration component comprises a first integration component, and the network application comprises a first network application, the method further comprising:
identifying a second enterprise application executable in the first computing environment, the second enterprise application compatible with a first version of a second network application executable in the second computing environment communicably coupled to the first computing environment so that a first set of functionality of the first version of the second network application is exposed through the second enterprise application;
identifying a second version of the second network application executable in the second computing environment, the second version of the second network application comprising a second set of functionality at least partially distinct from the first set of functionality of the second network application; and
delivering a second integration component from the second computing system to the first computing system over the network, the second integration component comprising a non-modifying add-on component to the second enterprise application that exposes at least a portion of the second set of functionality of the second version of the second network application through the second enterprise application.

9. The method of claim 8, wherein the second integration component exposes the second set of functionality to a plurality of versions of the first enterprise application.

10. The method of claim 8, wherein the first integration component extends and belongs only to the first enterprise application, and the second integration component extends and belongs only to the second enterprise application.

11. The method of claim 10, wherein the first integration component does not depend on the second integration component, and the second integration component does not depend on the first integration component.

12. The method of claim 10, wherein each of the first and second integration components comprise an application-specific, non-reusable add-on component to the respective first and second enterprise applications.

13. The method of claim 1, wherein the integration component is partitioned based on a deployment architecture of the enterprise application.

14. A computer storage medium encoded with a computer program, the program comprising instructions that when executed by one or more computers cause the one or more computers to perform operations comprising:
identifying at least one enterprise application executable in a first computing environment, the enterprise application compatible with a first version of a network application executable in a second computing environment communicably coupled to the first computing environment so that a first set of functionality of the first version of the network application is exposed through the enterprise application;
identifying a second version of the network application executable in the second computing environment, the second version of the network application comprising a second set of functionality at least partially distinct from the first set of functionality; and
delivering an integration component from the second computing system to the first computing system over a network, the integration component comprising an application specific, non-reusable and non-modifying add-on component that is uniquely associated with the enterprise application and exposes at least a portion of the second set of functionality of the second version of the network application through the enterprise application, the integration component configured to maintain an execution of the enterprise application without retesting.

15. The computer storage medium of claim 13, wherein the integration component comprises only one or more interfaces, customizing functionality, mapping functionality, and master data delta handling,
the integration component does not include persistency for transactional and master data, and the integration component does not include user interfaces,
the integration component does not adhere to accessibility, archiving, and internationalization product standards,
the integration component allows corrections only for existing versions of the enterprise application, and
the integration component does not depend on another integration component, and the other integration component does not depend on the integration component.

16. The computer storage medium of claim 14, wherein the operations further comprise:
changing the network application through an upgrade or update to the network application;
maintaining the integration component and the enterprise application at a substantially constant version based on the change to the network application;
changing the enterprise application through an upgrade or update to the enterprise application; and
maintaining the integration component at a substantially constant version based on the change to the enterprise application.

17. The computer storage medium of claim 14, wherein the enterprise application comprises a first enterprise application, and the network application comprises a first network application, and the operations further comprise:
identifying a second enterprise application executable in the first computing environment, the second enterprise application compatible with a first version of a second network application executable in the second computing environment communicably coupled to the first computing environment so that a first set of functionality of the first version of the second network application is exposed through the second enterprise application;
identifying a second version of the second network application executable in the second computing environment, the second version of the second network application comprising a second set of functionality at least partially distinct from the first set of functionality of the second network application; and
delivering a second integration component from the second computing system to the first computing system over the network, the second integration component comprising a non-modifying add-on component to the second enterprise application that exposes at least a portion of the second set of functionality of the second version of the second network application through the second enterprise application.

18. The computer storage medium of claim 17, wherein the second integration component exposes the second set of functionality to a plurality of versions of the first enterprise application.

19. The computer storage medium of claim 17, wherein the first integration component extends and belongs only to the first enterprise application, and the second integration component extends and belongs only to the second enterprise application.

20. The computer storage medium of claim 19, wherein each of the first and second integration components comprise an application-specific, non-reusable add-on component to the respective first and second enterprise applications.

21. A system of one or more computers configured to perform operations comprising:
   identifying at least one enterprise application executable in a first computing environment, the enterprise application compatible with a first version of a network application executable in a second computing environment communicably coupled to the first computing environment so that a first set of functionality of the first version of the network application is exposed through the enterprise application;
   identifying a second version of the network application executable in the second computing environment, the second version of the network application comprising a second set of functionality at least partially distinct from the first set of functionality; and
   delivering an integration component from the second computing system to the first computing system over a network, the integration component comprising an application specific, non-reusable and non-modifying add-on component that is uniquely associated with the enterprise application and exposes at least a portion of the second set of functionality of the second version of the network application through the enterprise application, the integration component configured to maintain an execution of the enterprise application without retesting.

22. The system of claim 21, wherein the integration component comprises only one or more interfaces, customizing functionality, mapping functionality, and master data delta handling,
   the integration component does not include persistency for transactional and master data, and the integration component does not include user interfaces,
   the integration component does not adhere to accessibility, archiving, and internationalization product standards,
   the integration component allows corrections only for existing versions of the enterprise application, and
   the integration component does not depend on integration component, and the other integration component does not depend on the integration component.

23. The system of claim 21, wherein the operations further comprise:
   changing the network application through an upgrade or update to the network application;
   maintaining the integration component and the enterprise application at a substantially constant version based on the change to the network application;
   changing the enterprise application through an upgrade or update to the enterprise application; and
   maintaining the integration component at a substantially constant version based on the change to the enterprise application.

24. The system of claim 21, wherein the enterprise application comprises a first enterprise application, the integration component comprises a first integration component, and the network application comprises a first network application, and the operations further comprise:
   identifying a second enterprise application executable in the first computing environment, the second enterprise application compatible with a first version of a second network application executable in the second computing environment communicably coupled to the first computing environment so that a first set of functionality of the first version of the second network application is exposed through the second enterprise application;
   identifying a second version of the second network application executable in the second computing environment, the second version of the second network application comprising a second set of functionality at least partially distinct from the first set of functionality of the second network application; and
   delivering a second integration component from the second computing system to the first computing system over the network, the second integration component comprising a non-modifying add-on component to the second enterprise application that exposes at least a portion of the second set of functionality of the second version of the second network application through the second enterprise application.

25. The system of claim 24, wherein the second integration component exposes the second set of functionality to a plurality of versions of the first enterprise application.

26. The system of claim 24, wherein the first integration component extends and belongs only to the first enterprise application, and the second integration component extends and belongs only to the second enterprise application.

27. The system of claim 26, wherein each of the first and second integration components comprise an application-specific, non-reusable add-on component to the respective first and second enterprise applications.

* * * * *